United States Patent
Brown et al.

(10) Patent No.: US 9,015,809 B2
(45) Date of Patent: Apr. 21, 2015

(54) ESTABLISHING CONNECTIVITY BETWEEN AN ENTERPRISE SECURITY PERIMETER OF A DEVICE AND AN ENTERPRISE

(75) Inventors: Michael Stephen Brown, Kitchener (CA); Herbert Anthony Little, Waterloo (CA); Graham Russell, Cambridge (CA); David Francis Tapuska, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/563,447

(22) Filed: Jul. 31, 2012

(65) Prior Publication Data

US 2013/0219471 A1  Aug. 22, 2013

Related U.S. Application Data

(60) Provisional application No. 61/600,902, filed on Feb. 20, 2012.

(51) Int. Cl.
*G06F 17/30* (2006.01)
*H04W 12/02* (2009.01)
*H04W 12/08* (2009.01)
*H04L 29/06* (2006.01)

(52) U.S. Cl.
CPC ........... *H04W 12/02* (2013.01); *H04L 63/0272* (2013.01); *H04W 12/08* (2013.01)

(58) Field of Classification Search
CPC ....... H04L 63/08; H04L 63/102; H04L 63/10; H04L 63/107; H04L 63/105; H04L 63/00; G06F 21/6218; G06F 21/00; G06F 2009/455; G06F 9/468; G06F 12/14; H04W 12/06; H04W 12/00
See application file for complete search history.

(56) References Cited

U.S. PATENT DOCUMENTS

| | | | |
|---|---|---|---|
| 6,587,928 B1 | 7/2003 | Periyannan et al. |
| 6,766,373 B1 | 7/2004 | Beadle et al. |
| 7,526,572 B2 | 4/2009 | Omar et al. |
| 7,634,572 B2 | 12/2009 | Nanduri et al. |
| 7,917,505 B2 | 3/2011 | van Gent et al. |
| 7,941,784 B2 | 5/2011 | Shenfield et al. |

(Continued)

FOREIGN PATENT DOCUMENTS

| | | |
|---|---|---|
| EP | 1791315 | 5/2007 |
| WO | 2005117392 | 12/2005 |

(Continued)

OTHER PUBLICATIONS

Aalto et al., "Bluetooth and WAP Push Based Location-Aware Mobile Advertising System," Jun. 2004, ACM, p. 49-58.*

(Continued)

*Primary Examiner* — Kambiz Zand
*Assistant Examiner* — Demaris Brown
(74) *Attorney, Agent, or Firm* — Fish & Richardson P.C.

(57) ABSTRACT

A first device establishes a connection with a second device and attempts access, via the connection to an enterprise server of an enterprise. The first device may have a number of security perimeters, ones of which are allowed to use various communications proxies provided by the second device. If the first device and the second device are associated with a same common enterprise, an enterprise perimeter of the first device may be enabled to access the enterprise using an enterprise proxy of the second device.

18 Claims, 11 Drawing Sheets

(56) References Cited

U.S. PATENT DOCUMENTS

| | | | |
|---|---|---|---|
| 8,050,684 B2 | 11/2011 | Lewis et al. | |
| 8,121,638 B2 | 2/2012 | Gisby et al. | |
| 8,161,521 B1* | 4/2012 | Venable, Sr. | 726/1 |
| 8,775,974 B2 | 7/2014 | Cowan et al. | |
| 8,782,148 B2 | 7/2014 | Gnech et al. | |
| 2006/0149846 A1* | 7/2006 | Schuba | 709/229 |
| 2006/0168259 A1 | 7/2006 | Spilotro et al. | |
| 2006/0195539 A1 | 8/2006 | Nichols et al. | |
| 2007/0013967 A1 | 1/2007 | Ebaugh et al. | |
| 2007/0072617 A1 | 3/2007 | Lewis et al. | |
| 2007/0101405 A1 | 5/2007 | Engle et al. | |
| 2007/0118895 A1* | 5/2007 | Coskun et al. | 726/15 |
| 2007/0124809 A1* | 5/2007 | Narin et al. | 726/6 |
| 2007/0130279 A1* | 6/2007 | Thacher | 709/208 |
| 2007/0180449 A1 | 8/2007 | Croft et al. | |
| 2008/0109871 A1* | 5/2008 | Jacobs | 726/1 |
| 2008/0137593 A1 | 6/2008 | Laudermilch et al. | |
| 2008/0139199 A1 | 6/2008 | Plestid | |
| 2008/0172449 A1 | 7/2008 | Bengtsson et al. | |
| 2008/0248834 A1 | 10/2008 | Chatterjee et al. | |
| 2009/0075697 A1* | 3/2009 | Wilson et al. | 455/557 |
| 2009/0150665 A1* | 6/2009 | Kaippallimalil et al. | 713/153 |
| 2009/0158420 A1* | 6/2009 | Ks et al. | 726/15 |
| 2009/0182803 A1 | 7/2009 | Barton et al. | |
| 2009/0282423 A1 | 11/2009 | Smith et al. | |
| 2010/0037057 A1* | 2/2010 | Shim et al. | 713/171 |
| 2010/0094996 A1 | 4/2010 | Samaha | |
| 2010/0153568 A1 | 6/2010 | Uola et al. | |
| 2010/0161960 A1 | 6/2010 | Sadasivan et al. | |
| 2010/0169392 A1 | 7/2010 | Lev Ran et al. | |
| 2010/0186079 A1 | 7/2010 | Nice et al. | |
| 2010/0191624 A1 | 7/2010 | Sharir et al. | |
| 2010/0195539 A1* | 8/2010 | Tian et al. | 370/255 |
| 2010/0220849 A1 | 9/2010 | Colbert et al. | |
| 2010/0281258 A1* | 11/2010 | Andress et al. | 713/168 |
| 2010/0299518 A1 | 11/2010 | Viswanathan et al. | |
| 2010/0325419 A1* | 12/2010 | Kanekar | 713/151 |
| 2011/0040848 A1 | 2/2011 | Xu | |
| 2011/0203491 A1 | 8/2011 | Wilson et al. | |
| 2011/0219129 A1* | 9/2011 | Allen et al. | 709/228 |
| 2011/0265151 A1* | 10/2011 | Furlan et al. | 726/4 |
| 2011/0289134 A1 | 11/2011 | de los Reyes et al. | |
| 2011/0316698 A1* | 12/2011 | Palin et al. | 340/540 |
| 2012/0002813 A1 | 1/2012 | Wei et al. | |
| 2012/0079007 A1 | 3/2012 | Brown et al. | |
| 2012/0079122 A1 | 3/2012 | Brown et al. | |
| 2012/0144019 A1* | 6/2012 | Zhu et al. | 709/224 |
| 2012/0173901 A1* | 7/2012 | Soliman et al. | 713/320 |
| 2012/0246484 A1* | 9/2012 | Blaisdell et al. | 713/189 |
| 2012/0303476 A1* | 11/2012 | Krzyzanowski et al. | 705/26.5 |
| 2013/0316682 A1* | 11/2013 | Vieira | 455/414.1 |

FOREIGN PATENT DOCUMENTS

| | | |
|---|---|---|
| WO | 2008042474 | 4/2008 |
| WO | 2009089626 | 7/2009 |
| WO | 2009102527 | 8/2009 |
| WO | 2010053999 | 5/2010 |
| WO | 2010129516 | 11/2010 |

OTHER PUBLICATIONS

Parmar et al., "Fireware for File Transfer Between Bluetooth Module and Flash Memory Through Microcontroller in an Emerging Concept of Wireless Portable Memory Access," 2010, IEEE, p. 42-46.*

Sadeghzadeh et al., "Notice of Violation of IEEE Publication Principles a New Secure Scheme Purposed for Recognition and Authentication Protocol in Bluetooth Environment," Feb. 2010, IEEE, p. 1326-1331.*

Sanchez et al., "BlueMall: A Bluetooth-based Advertisement System for Commerical Areas," Oct. 2008, ACM, p. 17-22.*

International Searching Authority, "International Search Report and Written Opinion of the International Searching Authority," issued in connection with international application No. PCT/CA2013/050128, mailed May 17, 2013, 8 pages.

European Patent Office, "Extended European Search Report," issued in connection with application No. EP 12179015.8, on Jun. 6, 2013, 11 pages.

BlackBerry, "BlackBerry PlayBook Tablet Version: 1.0 Security Technical Overview," Sep. 8, 2011, XP055064365, retrieved from the Internet on May 28, 2013, 46 pages—cited in European Search Report issued in connection with application No. EP 12179015.8.

Blackberry, "BlackBerry Device Service Feature and Technical Overview Version: 6.0," Feb. 16, 2012, XP055064082, retrieved from the Internet on May 24, 2013, 24 pages—cited in European Search Report issued in connection with application No. EP 12179015.8.

I-Jetty, Welcome! Welcome to the i-jetty console!, retrieved from the Internet on Apr. 6, 2011, 1 page.

Wikipedia, AJax (programming), http://en.wikipedia.org/wiki/Ajax_(programming), last modified on Jul. 29, 2011, 5 pages.

Wikipedia, Comet (programming), http://en.wikipedia.org/wiki/Comet_(programming), last modified on Jul. 4, 2011, 6 pages.

Feedfury, Android Colosseum, Interview: WebTide Developers speaks i-jetty and Google Android, Apr. 4, 2008, 4 pages.

Into Mobile, Run a web-server on your Android mobile phone with iJetty, internet posting dated Mar. 17, 2008, 11 pages.

Nokia Betalabs, Mobile Web Server, retrieved from the internet Apr. 4, 2011, 2 pages.

Cute Android, Open Source Android Apps for Developers: I-Jetty (webserver for the android mobile platform), retrieved from www.cuteandroid.com, retrieved from the internet on Apr. 6, 2011, 9 pages.

I-Jetty, I-Jetty: webserver for the android mobile platform, downloads page, powered by Google Project Hosting, retrieved from the Internet on Apr. 6, 2011, 1 page.

I-Jetty, I-Jetty: webserver for the android mobile platform, Creating Downloadable WebApps, powered by Google Project Hosting, retrieved from the Internet on Apr. 6, 2011, 7 pages.

Phonemag, i-Jetty turns Android cellphone into mobile webserver, www.phonemag.com, posted Mar. 17, 2008, 6 pages.

Ajax Push Engine, What is Ape, http://www.ape-project.org/about.html, retrieved from the internet on Aug. 2, 2011, 2 pages.

Sofotex, Idokorro Mobile Desktop, http://www.sofotex.com/Idokorro-Mobile-Desktop-download_L38662.html, retrieved from the Internet on Aug. 2, 2011, 5 pages.

Super Shareware, TS Mobiles 2.1.4, http://www.supershareware.com/info/tsmobiles.html, retrieved from the Internet on Aug. 5, 2011, 3 pages.

Wikipedia, Apache HTTP Server, http://en.wikipedia.org/wiki/Apache_web_server, retrieved from the Internet on Aug. 5, 2011, 4 pages.

WikiWebServer, What is WikiWebServer?, http://www.wikiwebserver.org/, retrieved from the Internet on Aug. 5, 2011, 2 pages.

Nokia, Mobile Web Server: How to Develop Content, Version 1.0; May 29, 2007, 23 pages.

June Fabrics Technology Inc., Pdanet for Android FAQS, internet article, Copyright 2003-2010, 2 pages.

Todd Rosenberry, Sans Institute, Protecting Your Corporate Network from Your Employee's Home Systems, GIAC Security Essentials Certification, Version 1.4b, Option 1, Dec. 21, 2003, 24 pages.

Stack Overflow, Comet for User based Notification over a Message Queue questions, asked Jun. 24, 2010, 1 pages.

Russell et al., The Bayeux Specification, Bayeux Protocol—Bayeux 1.0.0, http://svn.cometd.com/trunk/bayeux/bayeux.html, 2007, 25 pages.

Seopher, Multiple Ajax responses with 1 request (mootools and PHP), internet article, posted on Dec. 22, 2007 at 12:10 in Tutorials, 9 pages.

Member Wiki, Simple Protocol for Ajax Push, www.openajax.org, page last modified on Jun. 20, 2007, 3 pages.

You have got Hypertext, Schraefel, Journal of Digital Information, vol. 5, No. 1, 2004, 17 pages.

United States Patent and Trademark Office, "Non-Final Office Action," issued in connection with U.S. Appl. No. 13/204,227, on Mar. 1, 2013, 22 pages.

(56) References Cited

OTHER PUBLICATIONS

United States Patent and Trademark Office, "Final Office Action," issued in connection with U.S. Appl. No. 13/204,227, on Sep. 12, 2013, 24 pages.
United States Patent and Trademark Office, "Advisory Action," issued in connection with U.S. Appl. No. 13/204,227, on Nov. 19, 2013, 3 pages.
Patent Cooperation Treaty, "International Search Report," issued in connection with International Patent Application No. PCT/CA2011/050548, on Dec. 9, 2011, 3 pages.
Patent Cooperation Treaty, "Written Opinion," issued in connection with International Patent Application No. PCT/CA2011/050548, on Dec. 9, 2011, 5 pages.
Patent Cooperation Treaty, "International Search Report and Written Opinion, Corrected Version" issued in connection with International Patent Application No. PCT/CA2011/050548, on May 24, 2012, 10 pages.
United States Patent and Trademark Office, "Non-Final Office Action," issued in connection with U.S. Appl. No. 13/205,266, on Mar. 26, 2013, 13 pages.
United States Patent and Trademark Office, "Final Office Action," issued in connection with U.S. Appl. No. 13/205,266, on Sep. 11, 2013, 13 pages.
United States Patent and Trademark Office, "Advisory Action," issued in connection with U.S. Appl. No. 13/205,266, on Dec. 6, 2013, 3 pages.
Patent Cooperation Treaty, "International Search Report," issued in connection with International Patent Application No. PCT/CA2011/050547, on Oct. 18, 2011, 3 pages.
Patent Cooperation Treaty, "Written Opinion," issued in connection with International Patent Application No. PCT/CA2011/050547, on Oct. 18, 2011, 6 pages.
Patent Cooperation Treaty, "International Preliminary Report on Patentability," issued in connection with International Patent Application No. PCT/CA2011/050547, on Apr. 2, 2013, 7 pages.
Patent Cooperation Treaty, "International Preliminary Report on Patentability," issued in connection with International Patent Application No. PCT/CA2011/050548, on Mar. 26, 2013, 6 pages.
European Patent Office, "Extended European Search Report," issued in connection with European Patent Application No. 11810984.2, on Nov. 7, 2013, 8 pages.
Korean Patent Office, "Office Action," issued in connection with Korean Patent Application No. 10-2013-7007787, on Feb. 21, 2014, 4 pages.
Korean Intellectual Property Office, "Final Rejection," issued in connection with application No. KR 10-2013-7007787, on Aug. 28, 2014, 3 pages.
United States Patent and Trademark Office, "Office Action," issued in connection with U.S. Appl. No. 13/205,266, Sep. 8, 2014, 37 pages.
Canadian Intellectual Property Office, "Office Action," issued in connection with application No. CA 2,784,664, on Jul. 7, 2014, 2 pages.
International Bureau, "International Preliminary Report on Patentability," issued in connection with application No. PCT/CA2013/050128, mailed on Sep. 4, 2014, 6 pages.

\* cited by examiner

ESTABLISHING CONNECTIVITY BETWEEN AN ENTERPRISE SECURITY PERIMETER OF A DEVICE AND AN ENTERPRISE

CROSS-REFERENCE TO RELATED APPLICATIONS

This application claims the benefit of U.S. Provisional Application No. 61/600,902, filed Feb. 20, 2012, the entire content of which is expressly incorporated herein by reference.

TECHNICAL FIELD

This disclosure relates to establishing connectivity between a device and an enterprise, and, more particularly, to establishing connectivity services for an enterprise security perimeter within the device.

BACKGROUND

In many instances, computational devices may include data, applications, or network resources whose accessibility is controlled by security policies. As examples, the security policies may involve user accounts, administration rights, password protection, database management, access privileges, networking and other aspects that impact the operation of a device. Device resources may be apportioned according to different security requirements.

DESCRIPTION OF DRAWINGS

Like reference symbols in the various drawings indicate like elements.

DETAILED DESCRIPTION

Figure 1:
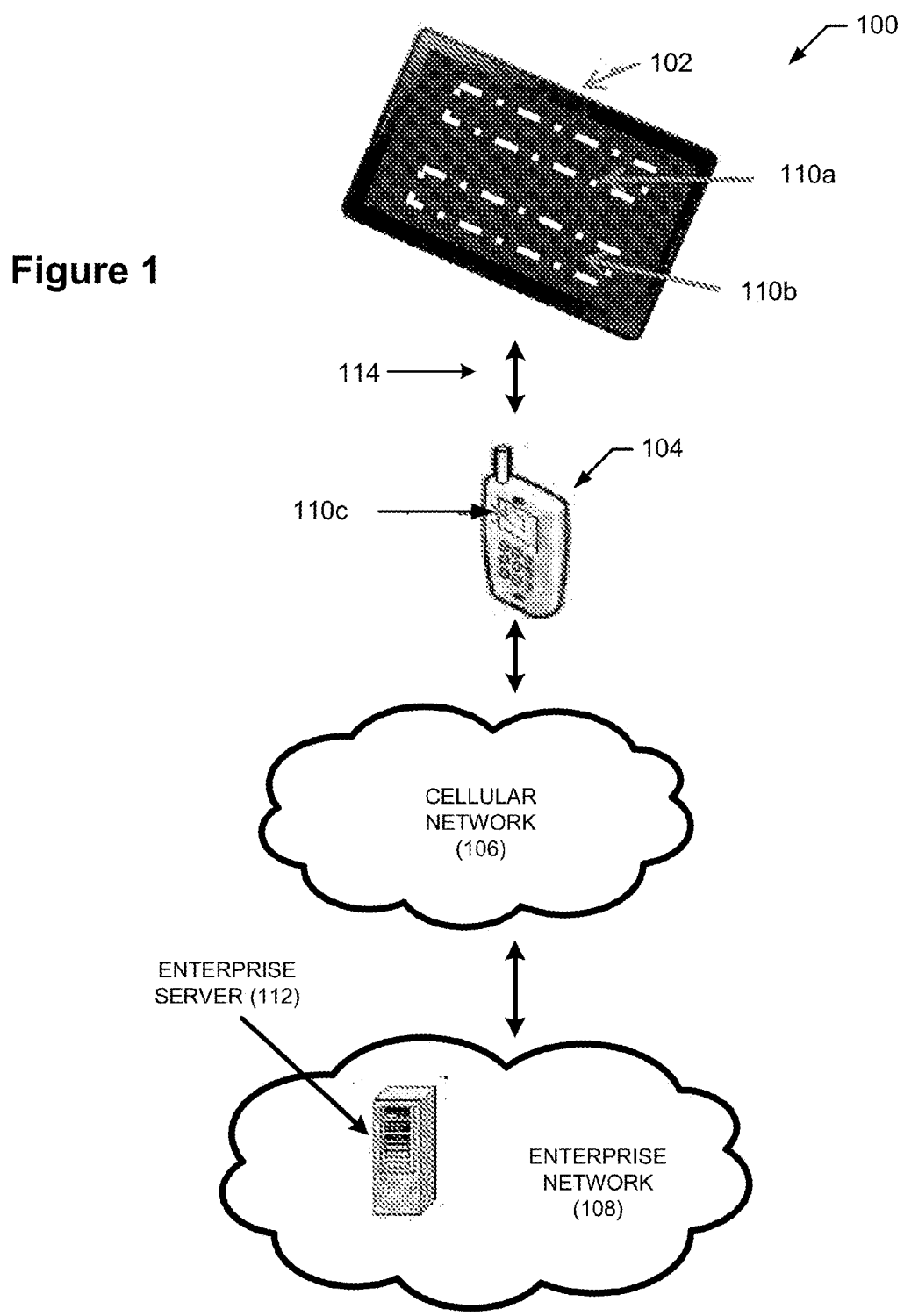
FIG. 1 is an example communication system illustrating a first computing device obtaining access to enterprise resources via a mobile communications device.

This disclosure is directed to systems and methods for enabling access to various network or proxy resources within different security perimeters configured in a computing device. A perimeter may generally refer to security policies to create a logical separation of resources such as applications, stored data, and network access. Resources included in a perimeter may be encrypted and password protected to securely separate those resources from resources in different perimeters. For example, resources in different perimeters may be prohibited from transferring data. In some implementations, perimeters may include personal perimeters and enterprise perimeters (or corporate perimeters). A personal perimeter may generally refer to a perimeter created by default for a user and managed by the same. An enterprise perimeter may generally refer to a perimeter created for or by a user and managed by a remote management server or service (e.g., a BlackBerry Enterprise Server (BES), a BlackBerry Playbook Administration Service (BPAS), or a BlackBerry Device Server (BDS), etc.) and may or may not be associated with an enterprise (e.g. business). In this disclosure, a perimeter configured in a computing device may also be referred to as security partition, security zone, persona, identity profile, or other similar terms, wherein operation within different perimeters are controlled by different security policies. Hereinafter, in the interest of brevity, reference will be made to perimeters to refer to any of the above-described terms. Hereinafter, a personal perimeter may refer to a perimeter configured and managed by an end user, while an enterprise perimeter may refer to a perimeter configured and managed by an enterprise device server.

Described herein are methods and systems for enabling enterprise proxy resources in an enterprise perimeter when accessing enterprise services via a mobile communications device that has a secure connection to the enterprise services. For example, an enterprise perimeter configured on a tablet computer may connect to an enterprise network through an enterprise proxy connection provided by a mobile communications device if the mobile communications device is already provisioned with a connection to the same enterprise network. As used herein, terms such as "enterprise" may refer to business or work relationship, but may also refer to other types of networking environments in which centralized resources are managed collectively.

A computing device (e.g., tablet computer) may establish a connection to a mobile communications device in order to access other networks. In some systems, the mobile communications device may be used as a proxy or gateway connection to provide the computing device with access to other networks. The computing device may access an enterprise network using "tethering" techniques, such as a through a mobile communications device. For example, the mobile communications device (e.g., BlackBerry smartphone) may have a secure connection to an enterprise network via mobile telecommunications services. The mobile communications device may access (e.g., through a cellular network) enterprise services that are associated with an enterprise network. The mobile communications device may provide access to the enterprise services and/or enterprise network to one or more perimeters configured in a tethered or otherwise associated computing device. In some implementations, the mobile communications device may perform tethering to the computing device through a direct wireless connection (e.g., Wireless LAN, Bluetooth™). In some implementations in accordance with this disclosure, an enterprise perimeter in a computing device can access, via tethering to the mobile communications device, enterprise services in an enterprise network. It should be apparent to persons of skill in the art that other types of devices may be used for tethering connectivity to an enterprise network. In this disclosure, for brevity, a mobile communications device will be used to describe a device that may selectively provide access to an enterprise network, via tethering or any other suitable pairing or connection.

FIG. 1 is an example communication system 100 illustrating a first computing device 102 obtaining access to enterprise resources via a mobile communications device 104. At a high-level, the system 100 includes a first computing device 102 communicably coupled to a mobile communications device 104. The mobile communications device 104 is communicably coupled to a cellular network 106 and an enterprise network 108. The first computing device 102 includes perimeters 110a and 110b configured to prevent access to partitioned resources. The mobile communications device 104 includes a mobile enterprise perimeter 110c configured to prevent access to resources associated therewith. The enterprise network 108 includes an enterprise server 112 for providing access to server resource accounts. As for a high level description of operation, the first computing device 102 may wirelessly transmit a connection request to connect to a network using the mobile communications device 104. The mobile communications device 104 may perform an authentication prior to allowing the connection and then transmit information indicating that the connection request is granted. The transmitted information may include information about the networks available at the mobile communications device 104, including an identification associated with the mobile enterprise perimeter 110c. The identification including in the transmitted information may be used by the first computing device 102 to determine if the mobile communications device 104 has a mobile enterprise perimeter 110c that is associated with one of perimeters 110a and 110b.

Turning to a more detailed description of the elements, the devices 102 and 104 may be any local or remote computing device operable to receive requests from the user via a user interface, such as a Graphical User Interface (GUI), a CLI (Command Line Interface), or any of numerous other user interfaces. In various implementations, the devices 102 and 104 may comprise electronic computing devices operable to receive, transmit, process and store any appropriate data associated with the communication system 100. As used in this disclosure, the devices 102 and 104 are intended to encompass any electronic device or computing device that has network communication capability. For example, the devices 102 and 104 may be a tablet computer, a personal computer, a laptop computer, touch screen terminal, workstation, network computer, kiosk, wireless data port, wireless or wireline phone, personal data assistant (PDA), smartphone, at least one processor within these or other devices, or any other suitable processing device. For example, the devices 102 and 104 may comprise mobile communication devices and may or may not include an input device, such as a keypad, touch screen, mouse, or other device that can accept information, and an output device that conveys information associated with the operation of the resources, including digital data, visual information, or GUI. The devices 102 and 104 may include fixed or removable storage media such as a magnetic computer disk, CD-ROM, flash memory, or other suitable media to both receive input from and provide output to users through the display, such as a GUI. In addition, the devices 102 and 104 may include less or more perimeters as compared with the illustrated perimeters in this and other figures.

In some implementations, the first computing device 102 and the mobile communications device 104 may wirelessly communicate using Bluetooth™, Wi-Fi, WiMAX, Near Field Communication (NFC), or other wireless communication protocols. The computing device 102 may communicate with the mobile communications device 104 through a wireless connection 114. The mobile communications device 104 may wirelessly communicate with the cellular network 106. For example, the mobile communications device 104 may include one or more wireless network capabilities, including 2nd generation (2G), 3rd generation (3G), and/or 4th generation (4G) telecommunications technology. Example 2G, 3G and 4G telecommunication network standards include Global System for Mobile communication (GSM), Interim Standard 95 (IS-95), Universal Mobile Telecommunications System (UMTS), CDMA2000 (Code Division Multiple Access), 3GPP long-term evolution (LTE), LTE-Advanced (LTE-A), and others.

In some implementations, the first computing device 102 may access the enterprise server 112 based on tethering, or any other connection, via the mobile communications device 104. In such case, if the mobile communications device 104 (e.g., a BlackBerry smart phone) includes tethering functionality and can perform cellular network communications with the enterprise server 112, the mobile communications device 104 may then be used as a connecting device (also referred to as tethering or bridging device) to enable communication between the first computing device 102 and the enterprise server 112. The first computing device 102 and the mobile communications device 104 may communicate using a direct wireless connection (e.g., Bluetooth™, Infrared, optical connection, Wi-Fi, WiMax, RFID, NFC, etc.), a wired connection (e.g., USB, Firewire, etc.), or personal or local area networks. The mobile communications device 104 may have access to an enterprise account maintained on the enterprise server 112. The mobile communications device 104 may also have a mobile enterprise perimeter 110c associated with the enterprise account, the mobile enterprise perimeter 110c maintaining security policies locally on the mobile communications device 104. The enterprise account may be, for example, an account that pushes data to the mobile communications device 104.

The enterprise network 108 may be a network associated with an enterprise. The enterprise may comprise a corporate or business entity, a government body, a non-profit institution, or any other organization, and may be associated with accounts configured on one or both of the devices 102 and 104. In some implementations, the enterprise may be the owner of devices 102 or 104. In some implementations, the device 102 or 104 may be owned the user, and, in these cases, the user may an enterprise to configure an enterprise perimeter on the device. Of course, the enterprise may also lease the devices 102 or 104 or may hire contractors or agents who are responsible for maintaining, configuring, controlling, and/or managing the devices 102 and 104. In the illustrated implementation, the network 108 facilitates communication with the devices 102 and 104. The network 108 may communicate, for example, Internet Protocol (IP) packets, Frame Relay frames, Asynchronous Transfer Mode (ATM) cells, voice, video, data, and other suitable information between network addresses. In addition, while the enterprise network 108 is illustrated as a single network, the network 108 may comprise a plurality of networks. In short, the enterprise network 108 is any suitable network that configured to communicate with the device 104. In the illustrated implementation, the enterprise network 108 includes the enterprise server 112.

The enterprise server 112 may include any software, hardware, firmware, or a combination thereof configured to manage access to one or more server resource accounts. The enterprise account may be, for example, an ActiveSync email, calendar, or contacts account. The enterprise account may be associated with an enterprise perimeter (e.g., 110a, 110b, and/or 110c) such that the enterprise perimeter may secure applications, data, and security policies for accessing the account. The enterprise server 112 may maintain or enforce resources, settings, and security policies associated with the enterprise perimeter and accounts. The enterprise server 112 may receive a request associated with the enterprise account and initiate generation of a perimeter 110 in connection with providing access to the account. In some implementations, the enterprise server 112 may transmit information indicating security policies for accessing a server resource account. As previously mentioned, the enterprise server 112 may also assign an enterprise identifier to a device in connection with granting access to a server user account. For example, the enterprise server 112 may transmit the enterprise identifier in connection with transmitting the security policies to the device 102 or 104. The enterprise identifier may include a network address, an employee number, or other character strings.

Figure 2A:
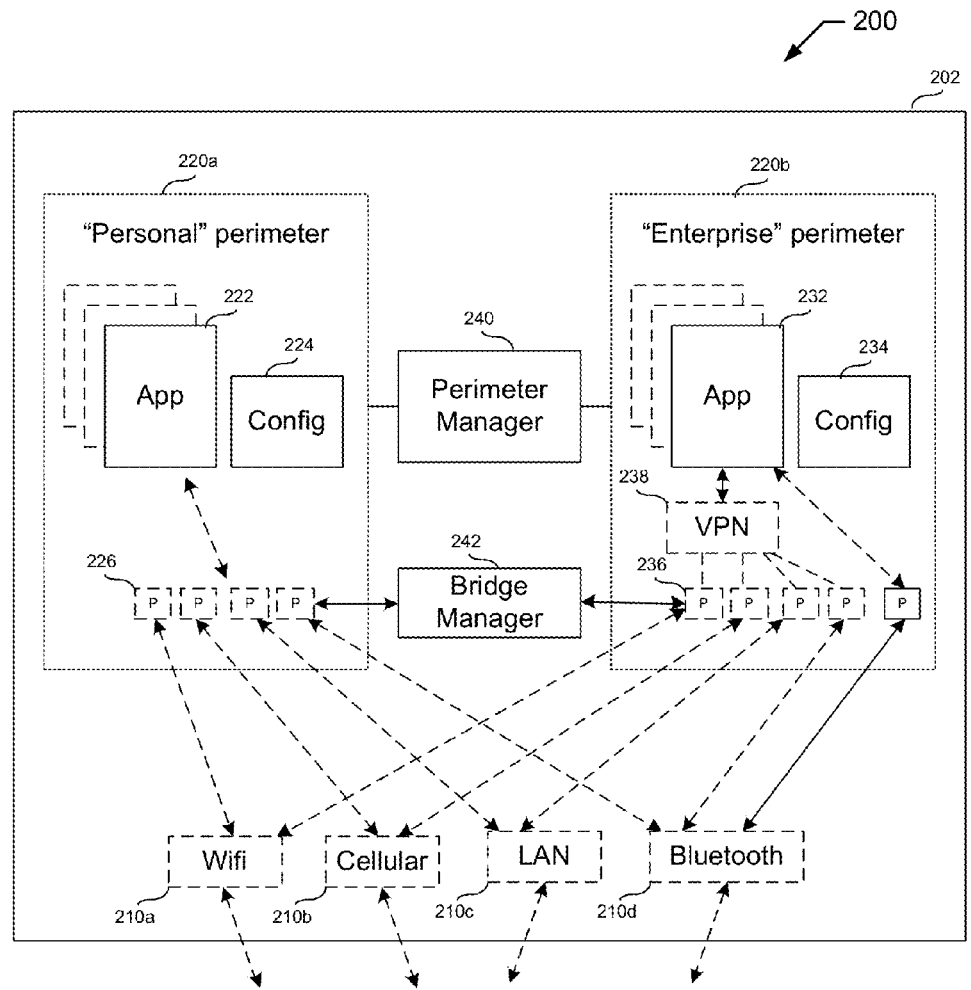
FIG. 2A is an example communication system similar to FIG. 1 in which one or more optional components of the first computing device are described.

FIG. 2A is an example communication system similar to FIG. 1 in which one or more optional components of the first computing device are described.

Figure 2B:
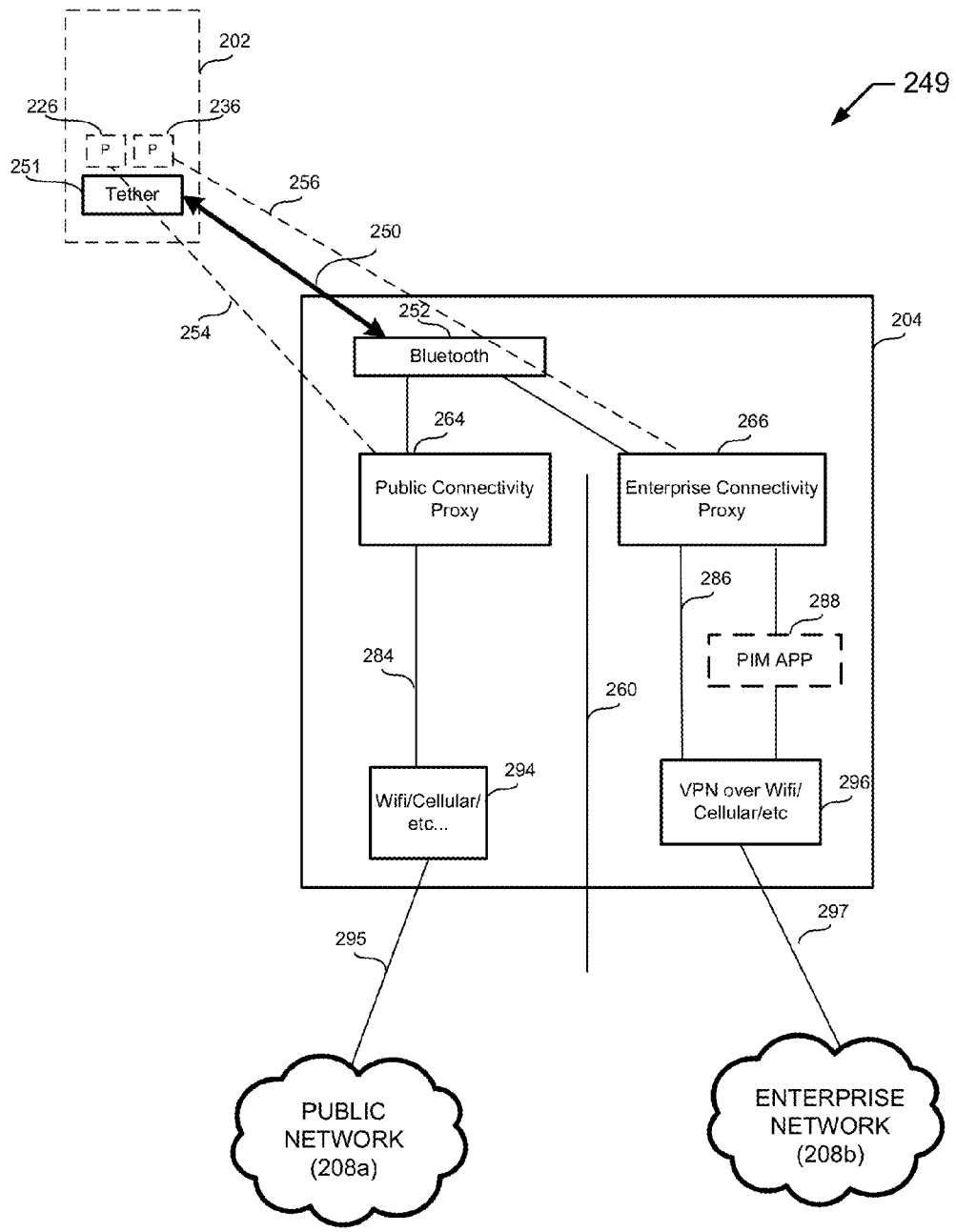
FIG. 2B is an example communication system similar to FIG. 1 in which one or more optional components of the mobile communications device are described.

The first computing device 202 comprises an example implementation for first computing device 102. As illustrated, the communication system 200 includes the first computing device 202 that may be communicably coupled to a mobile communications device 204, as shown in FIG. 2B at the arrow 250. The mobile communications device 204 may have access to a public network 208a and/or an enterprise network 208b. More details regarding mobile communications device 204 are described in relation to FIG. 2B. The first computing device 202 includes one or more network interface(s), which may include a Wi-Fi interface 210a, a cellular interface 210b, a local area network (LAN) interface 210c, a Universal Serial Bus (USB, not shown), and a Bluetooth™ interface 210d. Other interfaces may be provided and used in accordance with this disclosure. As described previously, the network interfaces may include a variety of wired or wireless communications interfaces known to persons of skill in the relevant art. In FIG. 2A, the network interfaces 210a-210d provide communication with mobile communications device 204. For example, the Bluetooth interface 210d may include a short range radio frequency connection (shown as arrow 250) between the first computing device 202 and the mobile communications device 204. The use of a short range radio frequency connection (or, alternatively, direct wired connection) may be referred to as tethering or pairing between the first computing device 202 and the mobile communications device 204.

First computing device 202 may be configured with one or more perimeters. In the example system in FIG. 2A, the first computing device 202 is configured with a first perimeter 220a and a second perimeter 220b. In the example of FIG. 2A, the first perimeter 220a is referred to as a "personal" perimeter, while the second perimeter 220b may be referred to as an "enterprise perimeter." In each of the perimeters 220a, 220b, a variety of applications, data, configurations, and network interfaces may be managed by one or more security policies associated with the perimeter. For example, the first perimeter 220a has a first application 222, data (not shown), configuration 224, and a number of ports (one of which is referred to with reference numeral 226). The second perimeter 220b includes one or more applications 232 (e.g. a "work" application), data (not shown), configuration 234, and a number of ports (one of which is referred to with reference numeral 236). The second perimeter 220b may also include virtual private network (VPN) functionality 238 that may be provided by hardware, software, or any combination thereof. A perimeter manager 240, which may include a bridge manager 242 in accordance with this disclosure, helps enforce the security policies and provide additional security policies which control access to each perimeter 220a, 220b. For example, the perimeter manager 240 may enforce password protection prior to allowing a user to invoke an application or resource associated with a particular perimeter.

The perimeter manager 240 may include a bridge manager 242. The bridge manager 242 may be part of the perimeter manager 240 or may be a separate module. The perimeter manager 240 and bridge manager 242 may be implemented as part of an operating system that controls the operation of the first computing device 202. The bridge manager 242 is responsible for managing the ports 226, 236 to facilitate access between the perimeters 220a, 220b and the interfaces 210a-210d. In one example, the bridge manager 242 may control the ports 226, 236 to facilitate tethering. In the example of FIGS. 2A and 2B, when a communications channel (shown as arrow 250) is established by tethering or pairing the first computing device 202 and the mobile communications device 204, the bridge manager 242 creates one or more separate sockets representing different sessions between the two devices. For example, the bridge manager 242 may create a first socket that is associated with a first proxy at the mobile communications device. Each socket may be associated with a session (also referred to as links) that is over a communications channel. A communications channel may have multiple communications sessions established over the same communications channel. In the example of FIG. 2A, a first socket at the first computing device 202 is directly associated with a first port at the mobile communications device 204. By establishing sockets that are associated with ports the two devices 202, 204 are able to maintain separation of the communications sessions between the devices. For example, a communications session related to a first socket are directed to a first proxy. Similarly, communications to/from second socket are directed to a second proxy, which is communicatively linked to enterprise network 208b. Rules implemented at the mobile communications device are used to keep the traffic for each session separated at the mobile communications device. Likewise, rules are established at the first computing device 202 to keep the sessions separated by associating the sessions with specific sockets and/or ports.

The bridge manager 242 maintains the ports 226, 236 at the first computing device 202 and may also create one or more "virtual interfaces" using the ports 226, 236 and the interfaces 210a-210d. Such virtual interfaces may be implemented by the operating system to identify the interfaces separately for each of the perimeters 220a, 220b, respectively. As can be seen in FIG. 2A, the first application 222 is in the first perimeter 220a and may utilize one or more ports 226 to access an interface 210a-210d to access the public network 208a. However, the first application 222 does not have access to the ports 236 that are only configured within the second perimeter 220b. The perimeter configurations for each of the perimeters may allow access for specific applications, such complexity is not the subject of the present disclosure. For the purpose of this disclosure, applications that are configured within a perimeter are only able to access network resources that are associated with a port in the same perimeter as the application. In some implementations one the ports 226 may be identified with a same port identification as one or the ports 236, such as when they are directed at the same physical interface and do not have perimeter-specific configurations. However, in this disclosure an instance of a port that is enabled within a perimeter is treated as a unique port that has been associated by the bridge manager to a specific physical interface, and in some cases also associated by the bridge manager to a specific session over the physical interface.

In this disclosure, a particular perimeter may include data, network access resources (e.g., via virtual interfaces), applications, configuration files, one or more policies, a combination of the foregoing, or other resources. The data may include various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the device and/or applications.

FIG. 2B is an example communication system 249 similar to FIG. 1 in which one or more optional components of the mobile communications device 204 are described. The system 249 shows the first computing device 202 being communicatively coupled (via communications channel 250) to the mobile communications device 204 using one or more ports 226, 236 and tethering 251, which may be accomplished using any of the interfaces 210a-210d of FIG. 2A. Over the communications channel 250, there may be one or more separate communications sessions 254, 256. In the example, a first communications session 254 from the first computing device 202 is associated with a connectivity proxy 264 of the mobile communications device 204. The public connectivity proxy 264 provides access 284 to public network 208a. The mobile communications device 204 may provide access 284 using one or more other network interfaces (such as Wi-Fi, cellular, etc.) represented in the figure generically as interfaces 294.

In the example, a second communications session 256 from the first computing device 202 may be associated with an enterprise connectivity proxy 266. The enterprise connectivity proxy 266 provides access 286 to the enterprise network 208b. In some implementations the enterprise connectivity proxy 266 may also provide access to data associated with a mobile enterprise perimeter (such as data associated with a Personal Information Management 'PIM' application configured on the mobile communications device and associated with an enterprise account). The connectivity to enterprise resources 297 may be provided using a security tunnel or virtual private network feature 296 between the mobile communications device 204 and the enterprise network 208b.

Figure 3A:
FIGS. 3A-C are example displays of a first computing device illustrating an example process for accessing an enterprise perimeter configured on the first computing device.

FIG. 3A is an example screen 300 illustrating access to an enterprise perimeter of a first computing device using a GUI. The GUI may be presented on a touchscreen display 300 of a computing device (e.g., a BlackBerry Playbook tablet PC), as described with regard to FIG. 1 or 2. As shown in the first screen 300 of the example GUI, the left hand side of the GUI displays content included in a personal perimeter 302. The personal perimeter 302 may be a default perimeter of the computing device, as described with regard to FIG. 2. Since the personal perimeter 302 may be a default perimeter, a user of the computing device may have the permission to access and manipulate the documents under the personal perimeter 302. The right hand side of the GUI displays information associated with an enterprise perimeter (or a corporate perimeter) 304. As indicated, the user has not logged in to the enterprise perimeter. Thus, the corporate screen associated with the enterprise perimeter 304 is locked. The user may slide or click the scroll bar 306 to trigger a password authentication process.

Figure 3B:

FIG. 3B is a second screen 320 of the example GUI. In this implementation, the screen 320 shows a pop-up window 322 prompting to receive the password to log in to the enterprise perimeter. Upon authenticating the password, the computing device may determine whether access to the resources is granted based upon the user credentials.

Figure 3C:
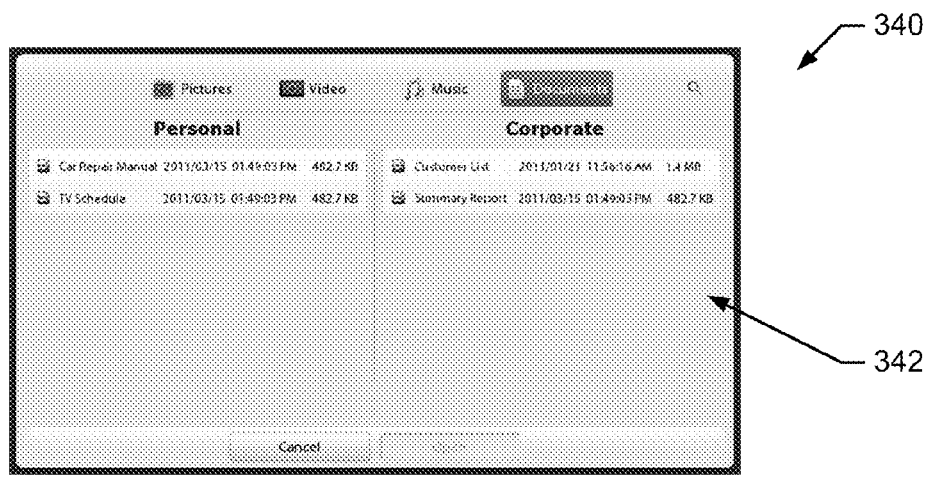

FIG. 3C is a third screen 340 of the example GUI. In these implementations, the personal perimeter 302 and the enterprise perimeter 342 are displayed separately. The documents included in the personal perimeter 302 and the enterprise perimeter 304 are logically separated from each other and stored in the computing device. The user may not be permitted to transfer documents between the personal perimeter 302 and the enterprise perimeter 342. As such, the corporate data included in the enterprise perimeter 342 may be secured.

Figure 4:
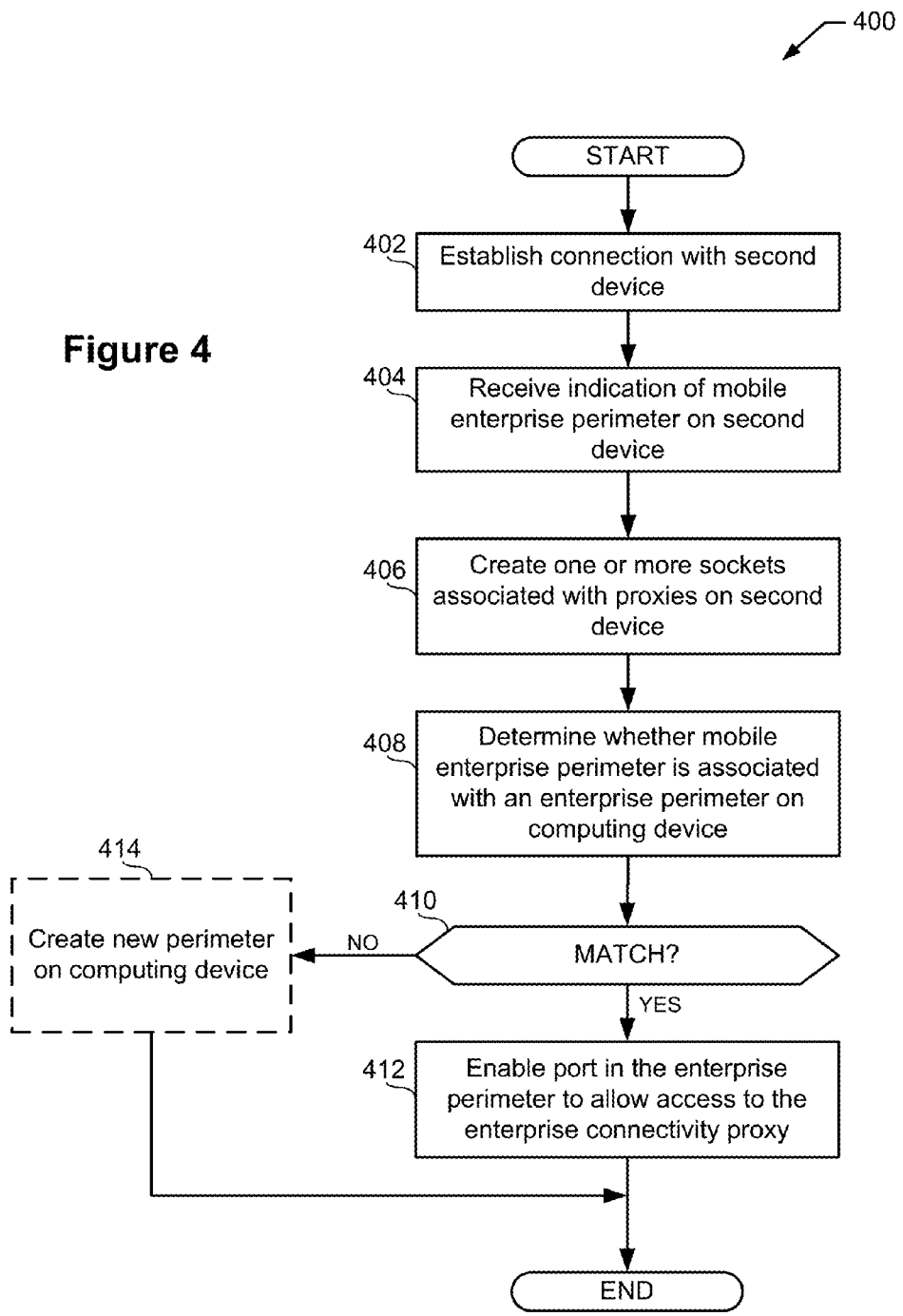
FIG. 4 is a flowchart illustrating an example method in which a first computing device establishes proxy services via a mobile communications device.

FIG. 4 is a flowchart illustrating an example method 400 in which a first computing device establishes proxy services via a mobile communications device. The method described in conjunction with FIG. 4 may be implemented using software, hardware, or any combination thereof. In one example, instructions that may be carried out by a processor to implement the method of FIG. 4 may be stored on computer-readable media such as memory, which may be tangible. In one alternative, the instructions may be hardcoded into a processor or other hardware. The illustrated method is described with respect to system 100 of FIG. 1, but this method could be used by any other suitable system. Moreover, the system 100 may use any other suitable techniques for manufacturing the system 100. Thus, some of the steps in this flowchart may take place concurrently and/or in a different sequence than as shown. System 100 may also use methods with additional steps, fewer steps, and/or different steps, so long as the methods remain appropriate.

Method 400 begins at step 402 where a computing device establishes a connection (e.g. communications channel) with a second device, such as a mobile communications device. Establishing the connection typically would include an authentication and verification process, whereby the computing device and the second device establish a first level of trust granting the use of the communications channel to create one or more sessions. Information related to the establishment of the connection may be found in U.S. patent application Ser. No. 13/195,587. At step 404, the computing device receives an indication of a mobile enterprise perimeter on the second device. Next, at step 406, the computing device creates one or more sockets associated with proxies on the second device. For example, the computing device may create a socket that is associated with an enterprise proxy providing access to an enterprise network. At step 408, the computing device determines whether the mobile enterprise perimeter of the second device is associated with an enterprise perimeter configured on the computing device. This step may include comparison on key, security information, perimeter identifier, or other comparisons.

At step 410, the method determines whether the enterprise perimeters match—in other words, whether they are both associated with the same enterprise. Steps 408 and 410 may be the same step in some implementations, or may be performed as separate tests. Step 410 may include an attempt to verify that the enterprise perimeter of the computing device and the mobile enterprise perimeter of the second device are both associated with the same enterprise network. Examples of techniques useful for step 410 may be seen in the descriptions of FIGS. 5-10.

Figure 5:
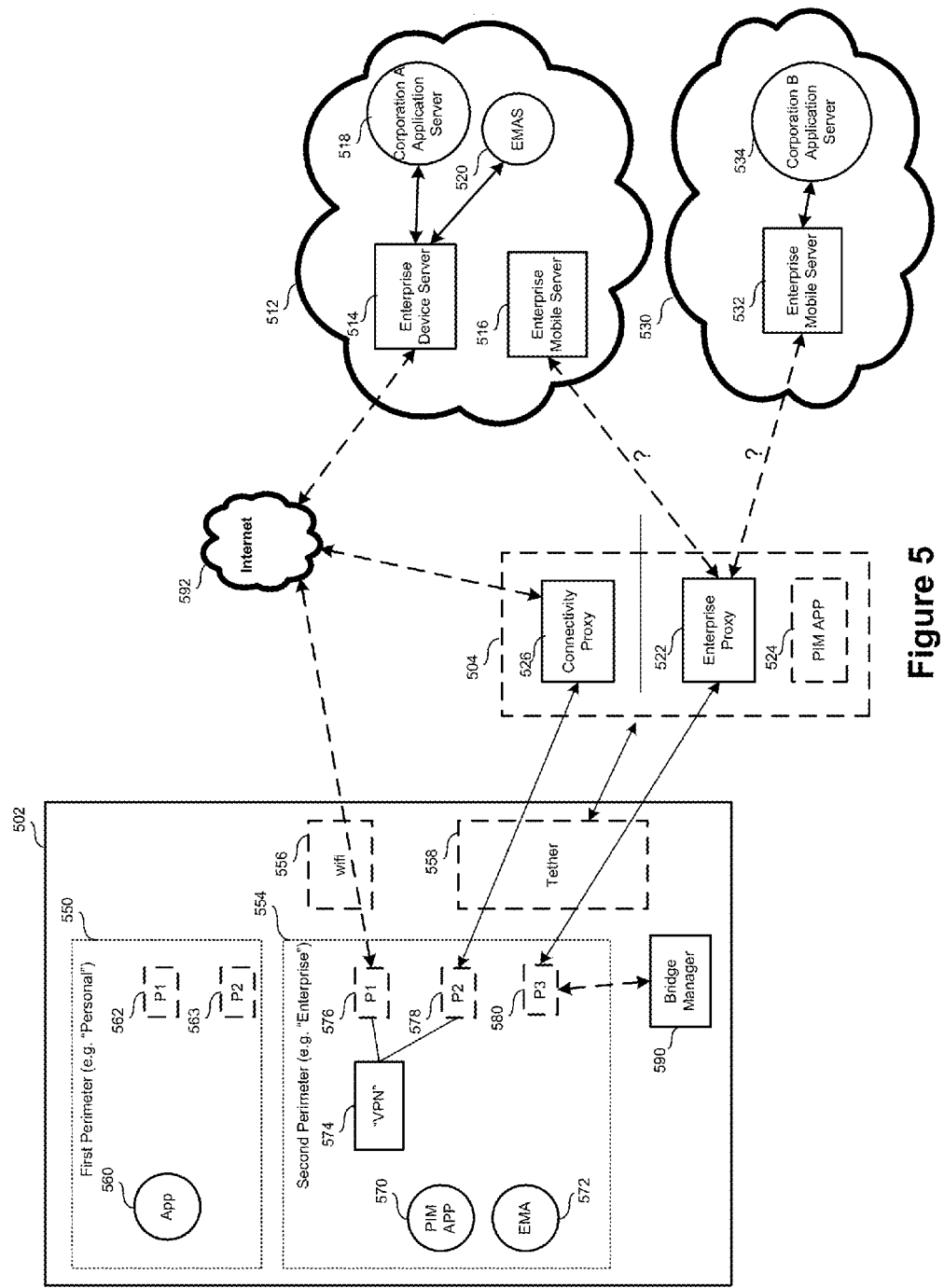
FIG. 5 is an example communication system including a first computing device having a number of optional security perimeters, and establishing proxy services via another device, such as a mobile communications device.

If the enterprise perimeter of the computing device does not match the mobile enterprise perimeter of the mobile communications device, optionally the computing device may create a new perimeter (e.g. "unknown corporate perimeter"), at step 414. If the enterprise perimeter of the computing device DOES match the mobile enterprise perimeter of the mobile communications device, then the bridge manager of the computing device enables a port in the enterprise perimeter to allow the enterprise perimeter to access the enterprise proxy, at step 412. FIG. 5, includes a first computing device 502, such as a computing device 102, 202, as well as a mobile communications device 504, which may be similar to mobile communication devices 104, 204.

In the example of FIG. 5, the first computing device 502 may be coupled to a communications device 504 that may be coupled to one of a first enterprise network 512 and a second enterprise network 530. The first computing device 502 may have been previously associated with an enterprise network (e.g., one of 512 or 530). Initially, it is unknown whether the mobile communications device 504 is coupled to the same enterprise network as the enterprise network associated with a particular security second perimeter of the computing device 502.

The first enterprise network 512 may include one or more servers, such as the enterprise device server 514 and an enterprise mobile server 516. An enterprise device server may refer to an administrative server that provides enterprise management of at least an enterprise perimeter on the computing device. An enterprise mobile server may refer a mobile data gateway that provides enterprise services to a mobile communications device. The first enterprise network 512 may also include one or more web services, such as a corporation A application server 518 and an enterprise management administrative service (EMAS) 520. Other servers or services may be included.

The second enterprise network 530 may include an enterprise mobile server 532 and a corporation B application server 534. In this disclosure, an application server, such as the corporation A application server 518 and a corporation B application server 534, may be any type of server or application that is maintained within an enterprise network. Examples of an application server may include an email server, mail gateway, file sharing server, intranet website server, data storage system, etc.

The mobile communications device 504 may include an enterprise proxy 522, which may be associated with either the enterprise mobile server 516 or the enterprise mobile server 532. In one example, the enterprise proxy 522 may be hardware and/or software that interfaces with an enterprise mobile server (such as either the enterprise mobile server 516 or an enterprise mobile server 532). Typically, the mobile communications device 504 will also be associated with one enterprise mobile server. However, when the computing device 502 first establishing pairing or tethering with the mobile communications device 504, a bridge manager 590 does not know whether the enterprise proxy 522 is connected to an enterprise mobile server (such as the enterprise mobile server 516) in the same enterprise network 512 as the enterprise device server 514 or to an different enterprise mobile server 532 in a different enterprise network 530. The mobile communications device 504 may include a personal information management application 524, a connectivity proxy 526, and other applications not shown.

The first communication device 502 includes a first perimeter 550 and a second perimeter 554. Services and systems within the first and second perimeters 550, 554 may be connected to one or more network resources via ports and interfaces such as Wi-Fi 556, tethering 558, or any other suitable interfaces. As shown in FIG. 5, these security perimeters may correspond to personal and enterprise perimeters, but this is merely one example of the security perimeters that may be used within the first computing device 502. In fact, fewer, more, or different security perimeters may be used.

The first perimeter 550, which may be a personal security perimeter, may include one or more applications 560, which may make use of a network connection, such as may be provided via ports 562, 563 that may reside within the personal security perimeter 550. The first port 562 may access the public network (e.g. "Internet") via one of any number of connections, including a WLAN network, wired network, or even using a connectivity proxy of a mobile communications device, as described in FIGS. 2A, 2B.

As shown in FIG. 5, the second perimeter 554, which may be an enterprise security perimeter, may include applications such as, for example, a personal information management application 570 and an enterprise management application 572. Other applications (not shown) may also be included. The second perimeter 554 may also include a VPN 574 that is connected to one or more ports 576, 578, 580. The ports may be controlled (e.g. enabled/disabled, exposed/hidden, configured/deactivated) by a bridge manager 590.

The applications make use of a connection to an enterprise device server 514 via port 576 that communicates with the enterprise device server 514 via one of any number of connections such as a Wi-Fi interface, including a WLAN network, wired network, public network, a connectivity proxy provided by a tethered mobile communications device, or via any other suitable connection. The port 576 is likely associated with a security certificate (e.g. SSL), the virtual private network (VPN) 574, or other types of encryption to provide private communication between the enterprise security perimeter 554 and the enterprise device server 514. The applications 570, 572 may optionally make use or a network connection provided by the mobile communications device 504 via port 578 or port 580 and the tethering interface 558. The ports 562, 563, 576, 578, 580 may be implemented using one or more proxies, or any other suitable software, hardware, or combination thereof.

As shown in FIG. 5, the second perimeter 554 may be connected through the VPN 574, the port 576, and the Wi-Fi connection 556 to the enterprise device service 514. When the first computing device 502 is paired or connected with the mobile communications device 504 (e.g., through tethering using Bluetooth, wired connection, etc.), the first computing device 502 may make use of some or all of the network resources provided by the mobile communications device 504. When initially paired, the port 578 in the second perimeter 554 may be enabled by the bridge manager 590. However, the port 578 is only allowed to use the connectivity proxy 526 of the mobile communications device 504 to obtain connectivity to a public network 592. If the computing device 502 determines that the mobile communications device 504 is connected to the same enterprise network 512 that is associated with the second perimeter (e.g., the enterprise device server 514), the bridge manager 590 of the computing device 502 may allow the enterprise perimeter 554 to access the enterprise proxy 522 of the mobile communications device via the port 580 and the tether 558.

Figure 6:
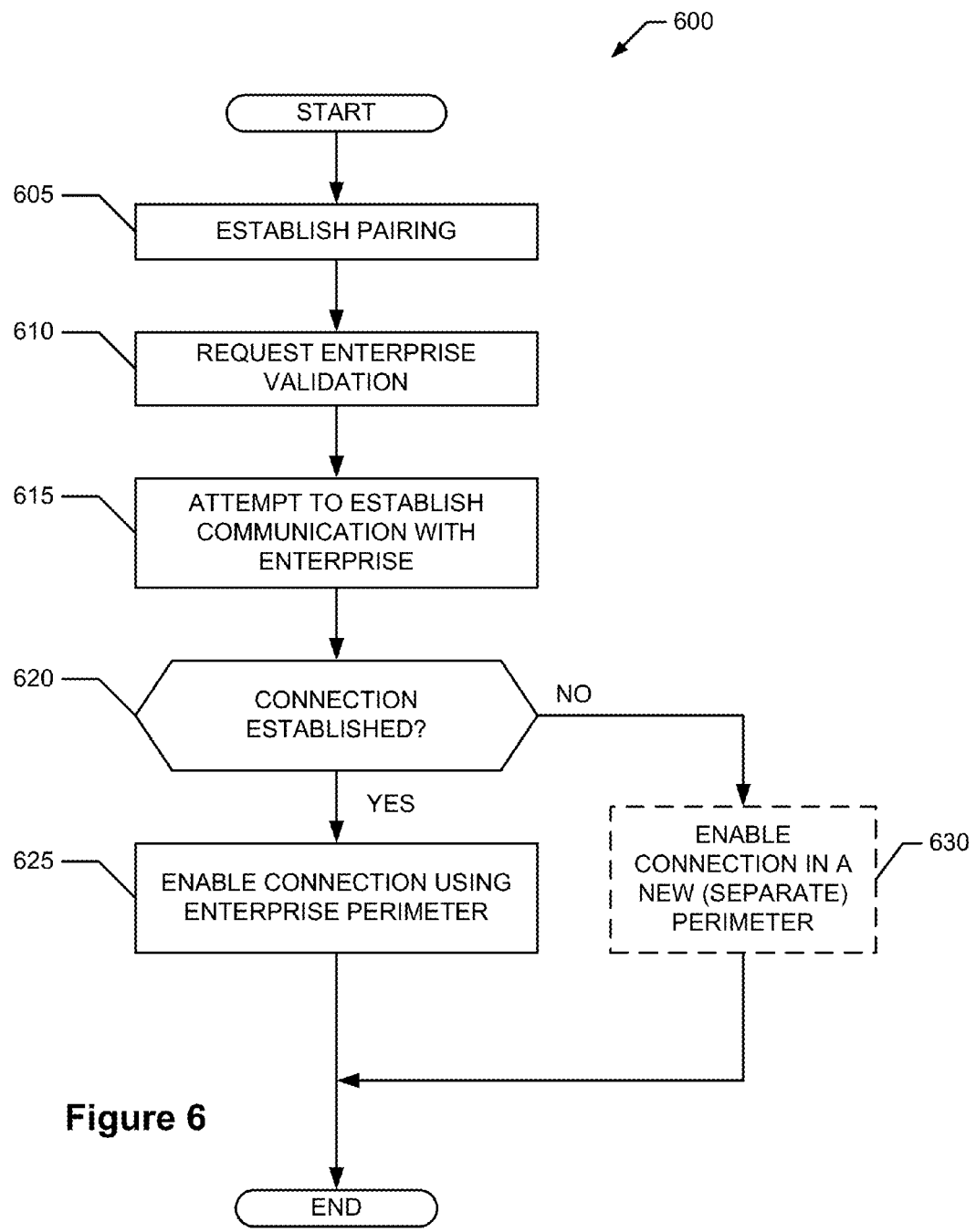
FIG. 6 is a flowchart illustrating an example method that the first computing device of FIG. 5 may use to determine whether a proxy connection via a mobile communications device should be associated with an enterprise perimeter.

FIG. 6 is a flowchart illustrating an example method 600 that the first computing device 502 of FIG. 5 may use to determine whether a network connection provided by the mobile communications device 504 should be associated with the second security perimeter (e.g., the enterprise security perimeter 554). The method described in conjunction with FIG. 6 may be implemented using software, hardware, or any combination thereof. In one example, instructions that may be carried out by a processor to implement the method of FIG. 6 may be stored on computer-readable media such as memory, which may be tangible. In one alternative, the instructions may be hardcoded into a processor or other hardware. As shown in FIG. 6, the first computing device 502 establishes pairing (e.g., tethering) with a mobile communications device 504 (block 605). The first computing device 502 requests enterprise validation to determine whether the enterprise associated with the first computing device 502 is the same as an enterprise with which the mobile communications device 504 is communicatively coupled (block 610). The first computing device 502 attempts to establish communication with the enterprise with which it is associated through the network connection provided by the tethered mobile communications device 504 (block 615). If the connection is established (block 620), that connection is associated with the enterprise with which the first computing device 502 is associated and, therefore, a port (e.g., the port 580) may be established or used for the tethered mobile communications device 504 within the enterprise security perimeter 554 (block 625). The port will allow access via the mobile communications device 504 using, for example, the tether 558 or any other suitable connection. Alternatively, if the connection cannot be established (block 620), the enterprises with which the first computing device 502 and the mobile communications device 504 are associated are different and, therefore, only a port providing interface to the connectivity proxy 526 (e.g., the port 578) will be established within the enterprise perimeter 554. Optionally, a new perimeter may be established on the computing device, and the new perimeter may be configured with another port that is associated with the enterprise with which the mobile communications device is connected (block 630).

Figure 7:
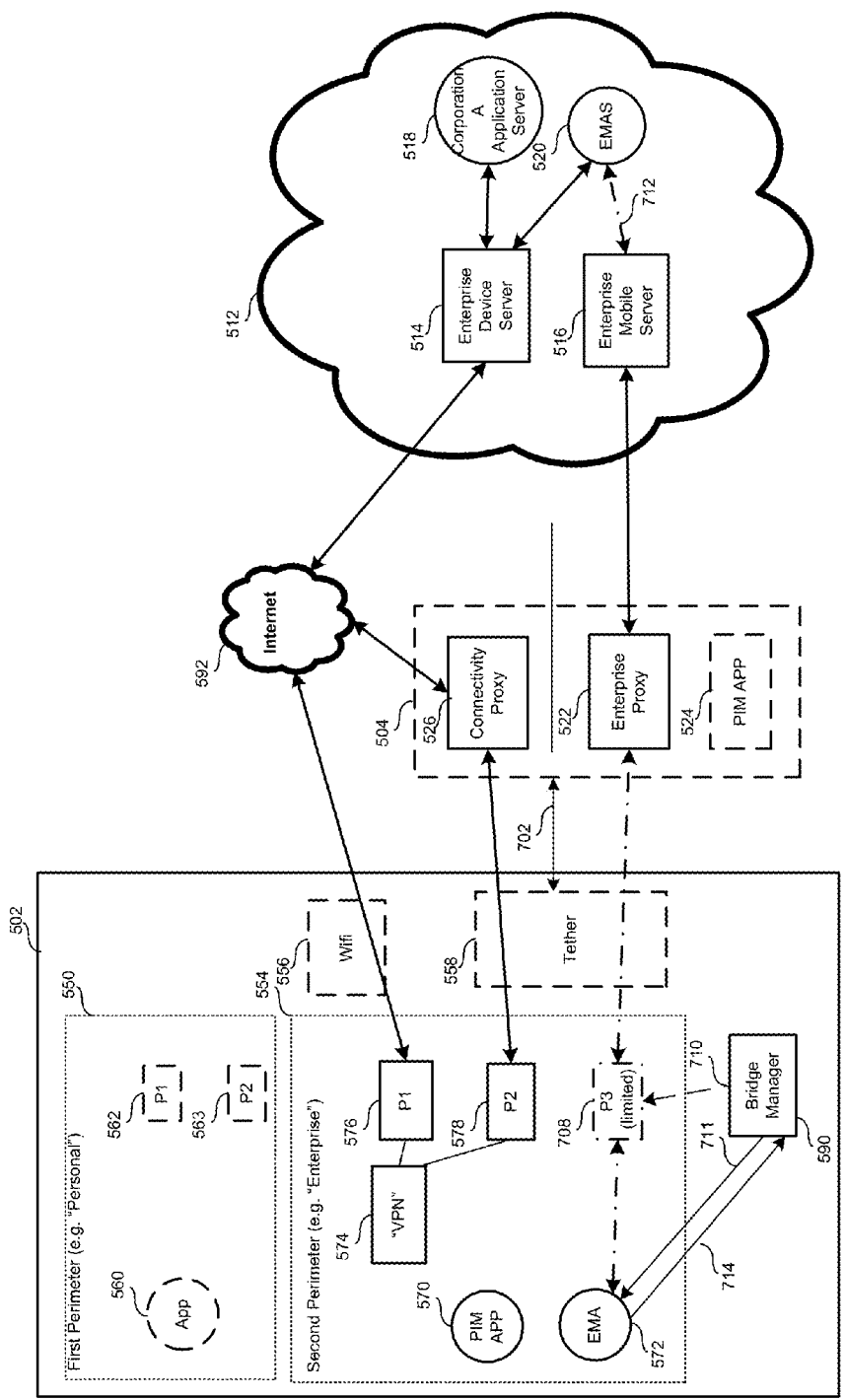
FIG. 7 shows the example communication system of FIG. 5 operating in accordance with the flowchart of FIG. 6, to determine whether a proxy connection provided by the mobile communications device should be associated with an enterprise perimeter.

FIG. 7 shows the example communication system of FIG. 5 operating in accordance with the flowchart of FIG. 6, to determine whether a connection provided by association with the mobile communications device 504 should be associated with the enterprise security perimeter 554 of the first computing device 502. In the example in FIG. 7, the mobile communications device 504 is paired with the first computing device 502 using a communications channel, such as a tether connection. The communications channel may be managed by the bridge manager 590 within the first computing device 502. While the bridge manager 590 may be implemented using software, the bridge manager 590 may be implemented using hardware, software, firmware, or any suitable combination thereof. Over the communications channel, a number of sessions may be established, including at least a first session that is linked to the enterprise proxy 522 of the mobile communications device 504 (reference number 702). The first session has an associated socket (not shown) that is related to the enterprise proxy 522. The bridge manager 590 controls the use of the associated socket within ones of the perimeters, and exposes the associated socket in the form of a "port" as described herein.

After the communications channel is established, the bridge manager 590 enables limited use of port 708 (reference number 710). The limited use of port 708 has security rules enforced by the bridge manager 590 (and, optionally, also enforce by rules at the mobile communications device 504) such that the limited use of port 708 provides only limited connectivity for the second perimeter 554. Specifically, the limited use of port 708 only provides connectivity for an enterprise management application 572 to attempt communication to an enterprise management administrative service 520. After establishing the limited use of port 708, the bridge manager 590 requests (reference number 711) the enterprise management application 572 to attempt to establish communication with an enterprise management administrative service 520 at the enterprise network 512 with which the second perimeter 554 is associated. The limited use of port 708 allows communications to pass from the enterprise management application 572 through the enterprise proxy 522 of the mobile communications device 504. The enterprise management application 572 uses the limited use of port 708 in an attempt to establish a connection (reference number 712), such as an SSL connection, to the enterprise management administrative service 520 through the enterprise proxy 522 of the mobile communications device 504 and its connection to the enterprise mobile server 516. If the enterprise management application 572 is able to connect with the enterprise management administrative service 520 through the enterprise mobile server 516, the first computing device 502, which is managed by an enterprise that hosts the enterprise management administrative service 520, must be associated with the first enterprise network 512 with which the mobile communications device 504 is also associated. The enterprise management application 572 reports (reference number 714) to the bridge manager 590 whether connectivity to the enterprise management administrative service 520 exists and, if such connectivity does exist, port 708 is made available to the rest of the applications within the enterprise security perimeter 554.

Figure 8:
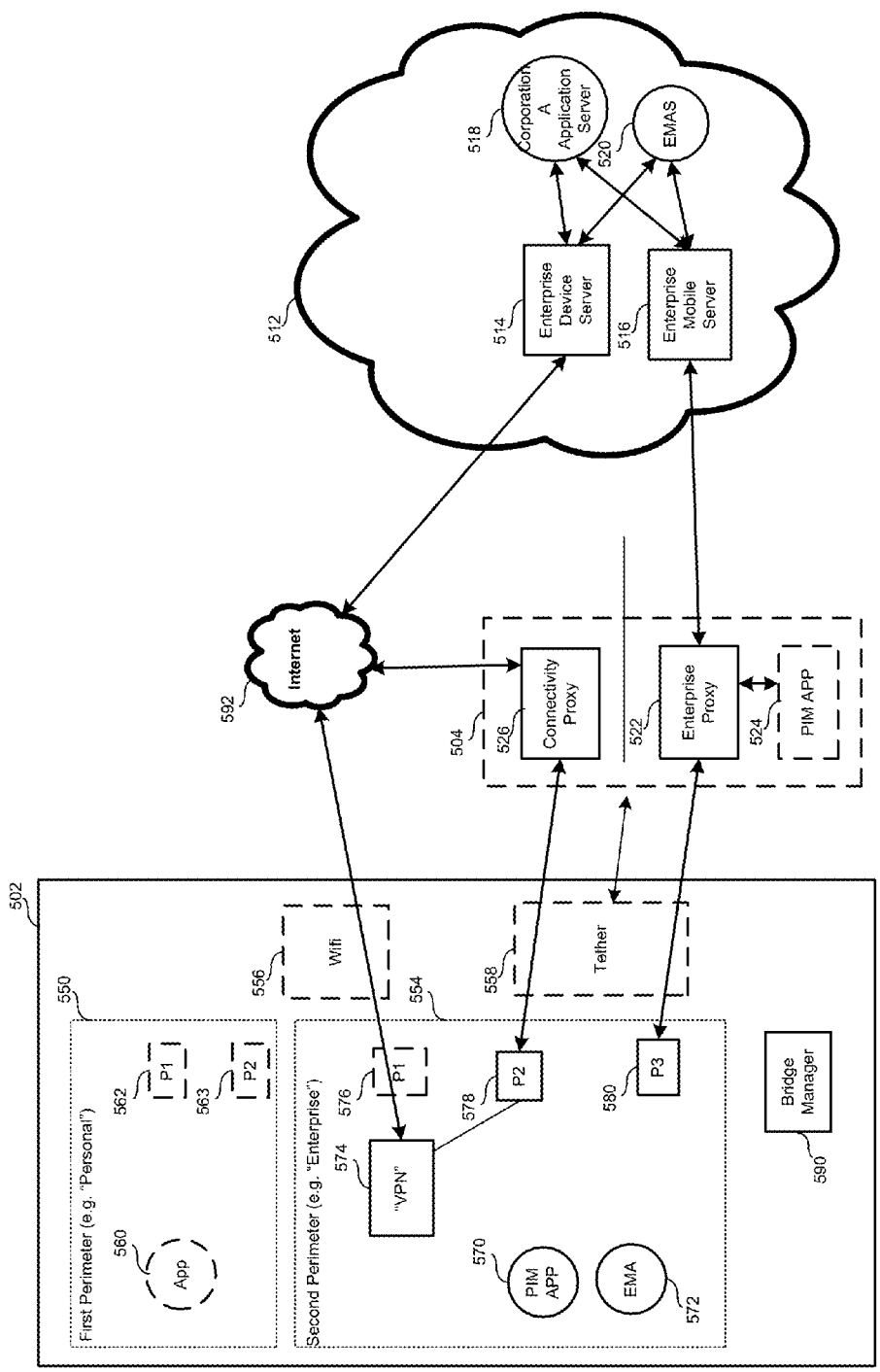
FIG. 8 shows the example communication system of FIG. 5 after the determination that the proxy connection provided by the mobile communications device should be associated with the enterprise perimeter.

While the foregoing has described a test in which a connection between the enterprise management administrative server 520 and the enterprise mobile server 516 is tested, other tests are possible. For example, any test that verifies that the enterprise management administrative server 520 and the enterprise mobile server 516 are part of the same network may be used. FIG. 8 shows the system of FIG. 7 after the process of FIG. 6 is been carried out and it is been determined that the first computing device 502 and the mobile communications device 504 are both associated with the first enterprise network 512. As shown in FIG. 8, both the personal information management application 570 and the enterprise management application 572 have access to the port 576, the port 578, and the port 580, which may be the same port 708 that was initially provided with limited utility. Additionally, the enterprise device server 514 and the enterprise mobile server 516 both have access to the corporation A application server 518 and the enterprise management administrative service 520.

While the foregoing example describes a pairing between the first computing device 502 and the mobile communications device 504, wherein both the first computing device 502 and the mobile communications device 504 are associated with the first enterprise network 512, it may be the case that the mobile communications device 504 is not associated with the first enterprise network 512. As shown in the figures, the mobile communications device 504 may not be associated with the first enterprise network 512, but, rather, may be associated with the second enterprise network 530.

Figure 9:
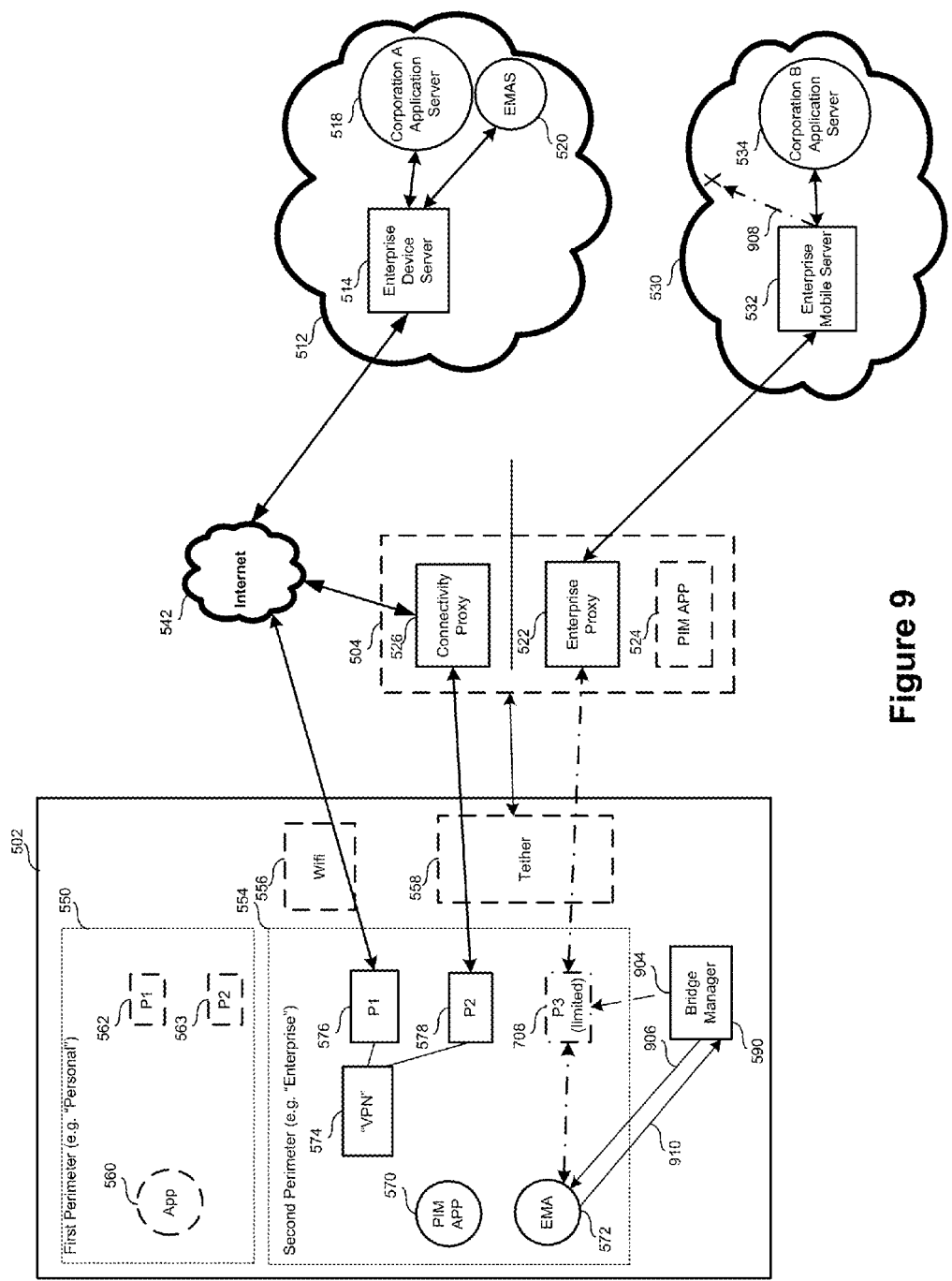
FIG. 9 shows another example communication system of FIG. 5 operating in accordance with the flowchart of FIG. 6, to determine whether a network connection provided by the mobile communications device should be associated with an enterprise perimeter.

FIG. 9 shows the example communication system of FIG. 5 operating in accordance with the flowchart of FIG. 6, to determine whether a virtual interface for a network connection provided by a mobile communications device 504 should be associated with the enterprise security perimeter 554. As shown in FIG. 9, the mobile communications device 504 is communicatively coupled with the first computing device 502. This pairing may be carried out through the use of software, such as the bridge manager 590 of the first computing device 502.

After pairing has been carried out, the bridge manager 590 establishes (reference number 904) a limited use of port 708, as described in FIG. 8. The bridge manager 590 then requests (reference number 906) the enterprise management application 572 to attempt to establish communication with the enterprise with which the first computing device 502 is associated. The enterprise management application 572 attempts to use the port 708 to establish a connection (reference number 908), such as an SSL connection, to the enterprise management administrative service 520 through the port 708 (and through the enterprise proxy 522 of the mobile communications device 504, and through the enterprise mobile server 532). The enterprise management application 572 will be unable to connect with the enterprise management administrative service 520 through the enterprise mobile server 532 because the enterprise mobile server 532 and the enterprise management administrative service 520 are within different enterprise networks 512, 530. The enterprise management application 572 reports (reference number 910) to the bridge manager 590 that connectivity to the enterprise management administrative service 520 does not exist and, because such connectivity does not exist, the port 708 is not made available to the enterprise security perimeter 554. The first communications device 502 is still bridged (tethered) to the mobile device 504, but it is directly associated with the connectivity proxy 526 of the mobile communications device 504. Therefore, the enterprise security perimeter 554 may use the port 578 to obtain public network access, but may not use the enterprise proxy 522 of the mobile communications device 504.

Figure 10:
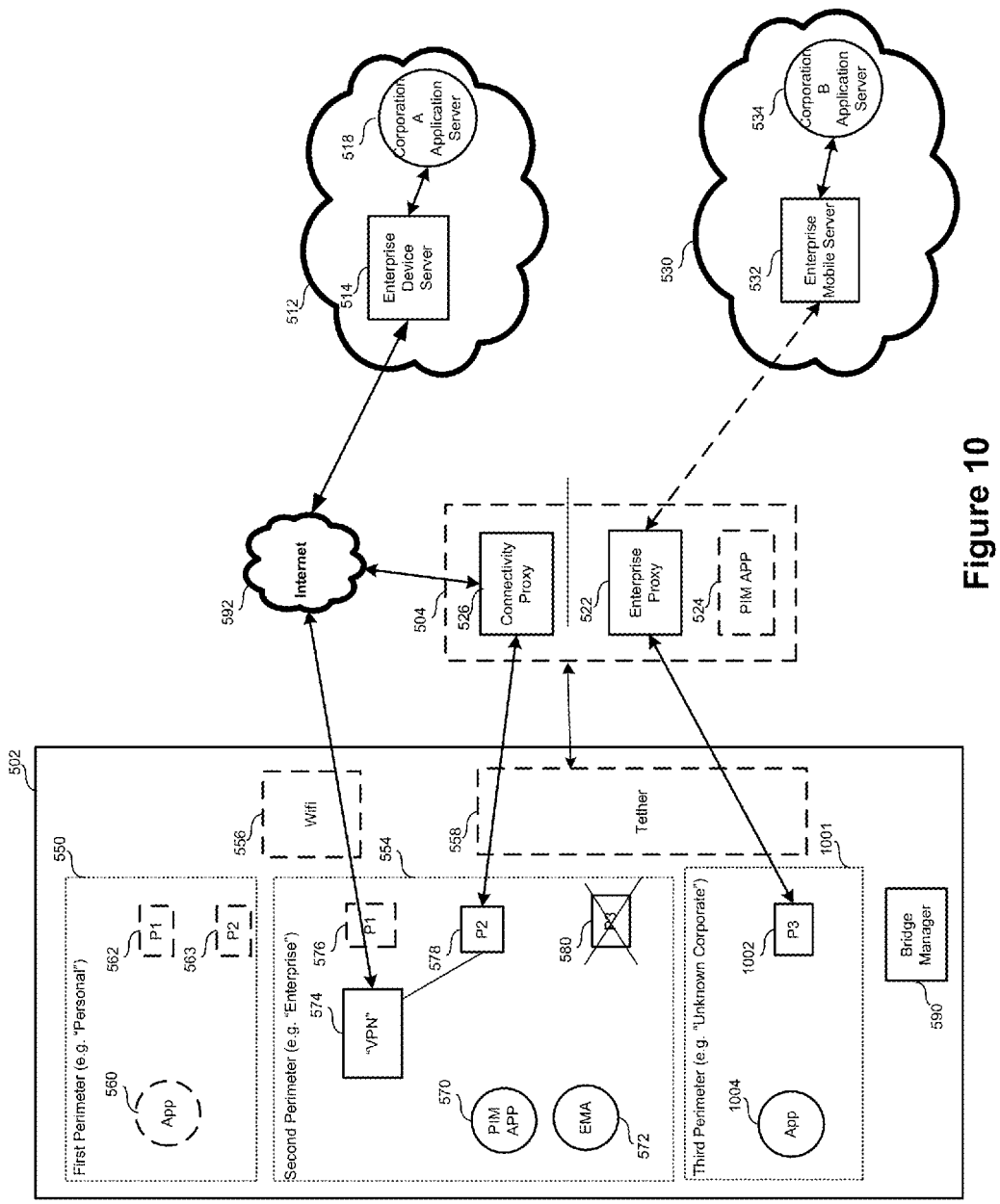
FIG. 10 shows the example communication system of FIG. 9 after the determination that the proxy connection provided by the mobile communications device should not be associated with the enterprise perimeter.

FIG. 10 shows the system of FIG. 5 after the process of FIG. 6 is been carried out and it is been determined that the first computing device 502 and the mobile communications device 504 are NOT both associated with the first enterprise network 512. As shown in FIG. 10, the personal information management application 570 has access to port 578 within the enterprise security perimeter 554.

While the bridge manager 590 is shown as operating within the first communication device 502, it is possible that the bridge manager 590 may operate partially or completely within the mobile communications device 504. For example, the bridge manager 590 may reside within the mobile communications device 504 and may control the ports 562, 563, 576, 578, and 580 via a tethered connection to the first communications device 502. According to this example, the enterprise proxy 522 could be controlled only to service the port 708 when request from the port 708 are made from the enterprise mobile application 572. In another example, the bridge manager 590 may operate partially or completely within another entity on the network. For example, an enterprise mobile service or an enterprise device server may host the bridge manager 590.

Optionally, because the bridge manager 590 may arbitrate access to the enterprise proxy 522 of the mobile communications device 504, the bridge manager 590 may cause the creation of a (new) third perimeter 1001 including a port 1002.

A number of embodiments of the invention have been described. Nevertheless, it will be understood that various modifications may be made without departing from the scope of the invention as represented by the following claims.

What is claimed is:

1. A method comprising:
   establishing a communications channel between a computing device and a mobile communications device, wherein the mobile communications device has established a connection to a private network;
   establishing one or more communications sessions over the communications channel, including at least a first communications session associated with a proxy of the mobile communications device, the proxy to facilitate communication with the private network;
   temporarily providing a limited access privilege allowing access to a first security perimeter on the computing device to only allow the computing device to send a request attempting to establish a connection with a service at the private network via the first communications session, the request to test if the private network to which the mobile communications device has established the connection includes the service indicating that the private network is associated with the first security perimeter; and
   selectively providing an access privilege to the first security perimeter of the computing device, the access privilege allowing applications of the first security perimeter to utilize the first communications session for further communications with the private network, wherein the access privilege is provided when the attempted connection with the service at the private network was established via the first communications session and private network is associated with the first security perimeter.

2. The method of claim 1, wherein the communications channel comprises a tethered communications channel.

3. The method of claim 1, wherein the providing the limited access privilege includes enabling a virtual communications port associated with an enterprise perimeter.

4. The method of claim 1, wherein the attempted connection is attempted by an enterprise management application in the first security perimeter, the enterprise management application attempting the connection via the first communications session using the limited access privilege, the method further comprising, when the attempted connection is established with the service at private network via the limited access privilege of the first communications session, the access privilege to the first communications session is enabled for other applications in the first security perimeter.

5. The method of claim 1, wherein the application at the private network comprises an enterprise management application.

6. The method of claim 1, wherein attempting communication with the private network comprises use of the proxy at the mobile communications device.

7. The method of claim 1, wherein attempting communication with the private network comprises requesting the application to attempt communication with the private network and wherein the application is in the first security perimeter.

8. The method of claim 1, wherein the service at the private network comprises an enterprise management administrative service.

9. The method of claim 1, further comprising, when the attempted connection with the service at the private network is not established, the first communications session is disabled.

10. The method of claim 9, further comprising:
establishing a second communications session over the communications channel, the second communications session not associated with the private network proxy.

11. A device comprising:
a hardware processor configured to:
establish a communications channel between the device and a mobile communications device, wherein the mobile communications device has established a connection to a private network;
manage at least one security perimeter established on the device, the security perimeter having associated applications and security policies;
temporarily provide a limited access privilege allowing access to the security perimeter on the device to only allow an enterprise management application on the device to send a request attempting to establish a connection with a service at the private network via a first communication session over the communication channel, the request to test if the private network to which the mobile communications device has established the connection includes the service indicating that the private network is associated with the first security perimeter; and
establish a communications socket in the security perimeter, the communications socket associated with the first communications session over the communications channel with the mobile communications device, wherein the hardware processor is configured to selectively enable or disable the communications socket in the security perimeter based upon whether the enterprise management application is able to establish the connection to the service at private network.

12. The device of claim 11, wherein the first communications session is established to an enterprise proxy on the mobile communications device.

13. The device of claim 11, wherein the communications channel is established via a wireless communications interface.

14. The device of claim 11, wherein the device is a tablet computer.

15. The method of claim 1, wherein the first security perimeter is associated with an authorized private network, the method further comprising:
when the connection with the service is not established and the private network is a second private network different from the authorized private network, restricting access to the first security perimeter while providing access to a second security perimeter of the computing device.

16. The method of claim 1, wherein the first security perimeter defines security policies to create a logical separation of resources and wherein first resources in the first security perimeter are allowed to access the private network and second resources in a second security perimeter are not allowed to access the private network.

17. The method of claim 1, wherein the providing is further based on determining if the first security perimeter matches a security perimeter of the mobile communications device.

18. The method according to claim 15, wherein the second security perimeter is established in response to determining that the private network is the second private network different from the authorized private network.

* * * * *